United States Patent
Zhu et al.

(10) Patent No.: US 10,643,460 B2
(45) Date of Patent: May 5, 2020

(54) MONITORING METHOD, DEVICE AND SYSTEM

(71) Applicant: SUZHOU TEKNECT ENGINEERING CO., LTD, Suzhou, Jiangsu (CN)

(72) Inventors: Chuangyu Zhu, Suzhou (CN); Liang Liu, Suzhou (CN)

(73) Assignee: SUZHOU TEKNECT ENGINEERING CO., LTD., Suzhou, Jiangsu (CN)

( * ) Notice: Subject to any disclaimer, the term of this patent is extended or adjusted under 35 U.S.C. 154(b) by 0 days.

(21) Appl. No.: 16/075,422

(22) PCT Filed: Feb. 4, 2016

(86) PCT No.: PCT/CN2016/073495
§ 371 (c)(1),
(2) Date: Aug. 3, 2018

(87) PCT Pub. No.: WO2017/132940
PCT Pub. Date: Aug. 10, 2017

(65) Prior Publication Data
US 2019/0043344 A1 Feb. 7, 2019

(51) Int. Cl.
*G08C 17/02* (2006.01)
*H04W 4/029* (2018.01)
(Continued)

(52) U.S. Cl.
CPC ............ *G08C 17/02* (2013.01); *H04W 4/029* (2018.02); *H04W 4/44* (2018.02); *H04L 67/42* (2013.01); *H04W 4/023* (2013.01)

(58) Field of Classification Search
USPC .................................................... 340/286.2
See application file for complete search history.

(56) References Cited

U.S. PATENT DOCUMENTS

2008/0133178 A1* 6/2008 Byrne ................ G05B 23/0235
702/184
2008/0154691 A1* 6/2008 Wellman .............. G05D 1/0282
705/7.26
(Continued)

FOREIGN PATENT DOCUMENTS

CN 201867812 U 6/2011
CN 202806632 U 3/2013
(Continued)

OTHER PUBLICATIONS

International Search Report (in English and Chinese) and Written Opinion of the International Searching Authority (in Chinese) issued in PCT/CN2016/073495, dated Oct. 26, 2016; ISA/CN.

*Primary Examiner* — Kerri L McNally
(74) *Attorney, Agent, or Firm* — Harness, Dickey & Pierce, P.L.C.

(57) ABSTRACT

A monitoring method, a monitoring device and a monitoring system are provided. The method includes: acquiring detected state information of an object to be checked within preset spot check time; receiving monitoring information, where the monitoring information includes spot check notification information fed back by a spot check device, a verification result based on the state information indicating whether spot check data of the object to be checked is true and transmitted by a terminal or a server, and at least one or any combination of execution instructions generated based on the verification result, where the spot check notification information includes the spot check data; and generating and/or executing the execution instruction for the object to be checked in a case where the monitoring information indicates that the spot check data is not true.

9 Claims, 4 Drawing Sheets (51) Int. Cl.
*H04W 4/44* (2018.01)
*H04L 29/06* (2006.01)
*H04W 4/02* (2018.01)

(56) References Cited

U.S. PATENT DOCUMENTS

| | | | | |
|---|---|---|---|---|
| 2009/0237245 | A1* | 9/2009 | Brinton | G07C 5/008 |
| | | | | 340/540 |
| 2010/0039247 | A1* | 2/2010 | Ziegler | G06Q 10/06 |
| | | | | 340/436 |
| 2011/0257811 | A1 | 10/2011 | Chiarini et al. | |
| 2013/0070056 | A1* | 3/2013 | Tripathi | G06Q 10/06 |
| | | | | 348/46 |
| 2015/0170521 | A1* | 6/2015 | McQuade | G06Q 50/30 |
| | | | | 701/29.6 |

FOREIGN PATENT DOCUMENTS

| | | |
|---|---|---|
| CN | 103927793 A | 7/2014 |
| CN | 105069705 A | 11/2015 |

* cited by examiner

MONITORING METHOD, DEVICE AND SYSTEM

CROSS-REFERENCE TO RELATED APPLICATION

The present application is a National Phase application of PCT International Patent Application No. PCT/CN2016/073495 filed on Feb. 4, 2016, the entire contents of which are incorporated herein by reference.

FIELD

The present disclosure relates to the technical field of fleet management application, and in particular to a monitoring method, a monitoring device and a monitoring system.

BACKGROUND

An industrial vehicle indicates a power-driven motor vehicle used for handling, jacking, dragging or stacking cargo, such as a common forklift truck nowadays. Therefore, the forklift truck is a main material handling device, and is widely applied in various departments in the national economy, such as stations, ports, airports, factories and warehouses.

In practice, in order to ensure the safety of device and operators in the operation of the industrial vehicle and the operation efficiency, a staff is usually arranged to perform a daily spot check on the industrial vehicle, such as checking whether braking, steering, driving or other operation states of the industrial vehicle is normal, and fill in a corresponding spot check report accordingly, as a reference for driving or managing the industrial vehicle.

However, in the conventional technology, the spot check report of the industrial vehicle is usually generated by filling in or entering relevant spot check information by the staff, hence it cannot be ensured that the spot check information is obtained after the staff has actually completed the daily spot check of the industrial vehicle, resulting in that the obtained spot check report may be not true. In this case, there are great safety hazards in the operation of the industrial vehicle, thereby affecting safety of the driver, and persons, goods and equipment around the industrial vehicle.

SUMMARY

In view of the above, a monitoring method, a monitoring device and a monitoring system are provided according to the present disclosure, with which the following technical problems in the conventional technology can be solved. In the conventional technology, it cannot be ensured that a spot check report is filled in after a staff actually completes a spot check of an industrial vehicle, resulting in that the spot check report is not true. In this case, there are great safety hazards in operation of the industrial vehicle, thereby affecting safety of the driver, and persons, goods and device around the industrial vehicle.

In order to achieve the above object, the following technical solutions are provided according to the present disclosure.

A monitoring method is provided. The method includes: acquiring detected state information of an object to be checked within preset spot check time; receiving monitoring information, where the monitoring information includes spot check notification information fed back by a spot check device, a verification result based on the state information indicating whether spot check data of the object to be checked is true and transmitted by a terminal or a server, and at least one or any combination of execution instructions generated based on the verification result, and the spot check notification information includes the spot check data of the object to be checked; and generating and/or executing the execution instruction for the object to be checked in a case where the monitoring information indicates that the spot check data of the object to be checked is not true.

In an embodiment, the receiving the monitoring information includes: receiving spot check notification information fed back by the spot check device; receiving spot check notification information forwarded by the terminal or the server; receiving a verification result generated and transmitted by the terminal or a verification result generated by the mobile terminal and forwarded by the server; receiving a verification result generated and transmitted by the server or a verification result generated by the server and forwarded by the terminal; receiving an execution instruction generated and transmitted by the terminal or an execution instruction generated by the terminal and forwarded by the server; or receiving an execution instruction generated and transmitted by the server or an execution instruction generated by the server and forwarded by the terminal.

In an embodiment, after the receiving the spot check notification information fed back by the spot check device, the method further includes: verifying, based on the state information, the spot check data of the object to be checked within the preset spot check time.

In an embodiment, the method further includes: receiving an information acquisition request transmitted by the terminal or the server; and transmitting the state information to the terminal or the server based on the information acquisition request.

In an embodiment, the acquiring detected state information of an object to be checked within preset spot check time includes: acquiring motion information of the object to be checked within the preset spot check time detected by multiple sensors, where the motion information includes one or more of vibration information of a power component, attitude changing information, speed changing information, and current changing information; and/or acquiring image information on spot check of the object to be checked within the preset spot check time acquired by a video monitoring device.

In an embodiment, the monitoring information indicating that the spot check data of the object to be checked is not true includes: the monitoring information indicating that the power component of the object to be checked does not operate within the preset spot check time; the monitoring information indicating that an actual attitude of the object to be checked does not change within the preset spot check time; and/or the monitoring information indicating that an actual attitude changing trajectory of the object to be checked within the preset spot check time is inconsistent with an attitude changing trajectory recorded in the spot check data.

In an embodiment, the generating and/or executing the execution instruction for the object to be checked includes: outputting and/or executing first prompt information or a first locking instruction, where the first locking instruction is used for locking the object to be checked.

In an embodiment, the method further includes: acquiring a trigger signal received by a near field detection device arranged within a first range around the object to be checked, where the trigger signal is generated when a spot check operator triggers the near field detection device; verifying, based on the trigger signal, whether the spot check operator is in the first range around the object to be checked within the preset spot check time. The monitoring information indicating that the spot check data of the object to be checked is not true includes: the spot check operator is not in the first range around the object to be checked within the preset spot check time.

In an embodiment, the method further includes: acquiring geographical location information of the spot check operator within the preset spot check time; verifying whether the spot check operator is in a second range around the object to be checked within the preset spot check time based on the geographical location information and target location information of the object to be checked. The monitoring information indicating that the spot check data of the object to be checked is not true includes that: the spot check operator is not in the second range around the object to be checked within the preset spot check time.

A monitoring device is provided, which includes: a data transmission module, a communication module and a control module. The data transmission module is configured to acquire detected state information of an object to be checked within preset spot check time. The communication module is configured to receive monitoring information, where the monitoring information includes spot check notification information fed back by a spot check device, a verification result based on the state information indicating whether spot check data of the object to be checked is true and transmitted by a terminal or a server, and at least one or any combination of execution instructions generated based on the verification result, where the spot check notification information includes the spot check data of the object to be checked. The control module is configured to generate and/or execute the execution instruction for the object to be checked in a case where the monitoring information indicates that the spot check data of the object to be checked is not true.

In an embodiment, the device further includes a verification module. The verification module is configured to verify the spot check data of the object to be checked within the preset spot check time based on the state information acquired by the data transmission module.

In an embodiment, the communication module is further configured to receive an information acquisition request transmitted by the terminal or the server and transmit the state information to the terminal or the server.

In an embodiment, The data transmission module is configured to acquire a trigger signal received by a near field detection device arranged within a first range around the object to be checked, where the trigger signal is generated when a spot check operator triggers the near field detection device; and the control module is configured to verify, based on the trigger signal, whether the spot check operator is in the first range around the object to be checked within the preset spot check time, and generate and/or execute the execution instruction for the object to be checked in a case where the spot check operator is not in the first range around the object to be checked within the preset spot check time. Alternatively, the data transmission module is configured to acquire geographical location information of the spot check operator within the preset spot check time; and the control module is configured to verify whether the spot check operator is in a second range around the object to be checked within the preset spot check time based on the geographical location information and target location information of the object to be checked, and generate and/or execute the execution instruction for the object to be checked in a case where the spot check operator is not in the second range around the object to be checked within the preset spot check time.

A monitoring system includes: the monitoring device described above and a detection device. The detection device is configured to detect state information of the object to be checked within preset spot check time.

In an embodiment, the detection device includes: multiple sensors and/or a video monitoring device. The sensors are configured to detect motion information of the object to be checked within the preset spot check time, where the motion information includes one or more of vibration information of a power component, attitude changing information, speed changing information, and current changing information. The video monitoring device is configured to acquire image information on spot check of the object to be checked within the preset spot check time.

As can be seen, compared with the conventional technology, a monitoring method, a monitoring device and a monitoring system are provided in the present disclosure. A spot check operator may transmit relevant information on spot check to the monitoring device after the spot check operator completes the spot check of the object to be checked by using a spot check device. That is, the monitoring device receives spot check notification information fed back by the spot check device and acquires detected state information of the object to be checked within the preset spot check time, thereby directly verifying whether received spot check data of the object to be checked is true. An execution instruction for the object to be checked is generated in a case where the received spot check data of the object to be checked is not true, thereby avoiding safety hazards of the object to be checked in an operating process due to a false spot check report. Moreover, the spot check notification information fed back by the spot check device may be transmitted to a terminal or a server for subsequent verification, and then a verification result indicating whether the spot check data of the object to be checked is true or an execution instruction generated based on the verification result is transmitted to the monitoring device. The monitoring device generates and/or executes the execution instruction for the object to be checked based on the verification result. In this case, potential safety hazards in the operating process of the object to be checked due to the false spot check report is avoided, and a safety risk of the driver, and persons, goods and equipment around the object to be checked is reduced. In addition, a monitoring solution according to the present disclosure is more flexible and adapts to more application scenarios.

BRIEF DESCRIPTION OF THE DRAWINGS

In order to more clearly illustrate technical solutions according to the embodiments of the present disclosure or according to the conventional technology, the drawings to be used in the description of the embodiments or the conventional technology are briefly described below. Apparently, the drawings in the following description only describe some embodiments of the present disclosure, and other drawings may be obtained by those skilled in the art according to the drawings provided herein without any creative work.

DETAILED DESCRIPTION

The technical solutions according to the embodiments of the present disclosure are described clearly and completely in conjunction with the drawings in the embodiments of the present disclosure hereinafter. It is apparent that the described embodiments are only a few rather than all of the embodiments of the present disclosure. Any other embodiments obtained based on the embodiments of the present disclosure by those skilled in the art without any creative work fall within the scope of protection of the present disclosure.

In the actual application of the embodiment, in order to ensure the reliable and safe operation of an industrial apparatus, such as a forklift truck, an in-plant transport vehicle, a climbing maintenance vehicle and a sweeping machine, it is usually required that a spot check operator performs a daily spot check by using a spot check device, for example checking operations such as braking, steering and travelling of an object to be checked. After the spot check is completed, it is usually required that the spot check operator fills in or input a spot check result, so as to generate a corresponding spot check report accordingly.

It may be seen that the authenticity of the spot check report depends on the authenticity of the corresponding point check result, that is, the authenticity of corresponding spot check data. In order to verify the authenticity of the spot check report, a monitoring method, a monitoring device and a monitoring system are provided according to the present disclosure, so as to avoid that the spot check report is not true and safety hazards in an operation process of the industrial vehicles are caused, thereby preventing affecting the safety of the driver and persons, goods and equipment around the industrial vehicle. A spot check operator may transmit relevant information on spot check to the monitoring device after the spot check operator completes the spot check of the object to be checked by using a spot check device. That is, the monitoring device receives spot check notification information fed back by the spot check device and acquires detected state information of the object to be checked within the preset spot check time, thereby directly verifying whether received spot check data of the object to be checked is true. An execution instruction for the object to be checked is generated in a case where the received spot check data of the object to be checked is not true, thereby avoiding safety hazards of the object to be checked in an operating process due to a false spot check report. Moreover, the spot check notification information fed back by the spot check device may be transmitted to a terminal or a server for subsequent verification, and then a verification result indicating whether the spot check data of the object to be checked is true or an execution instruction generated based on the verification result is transmitted to the monitoring device. The monitoring device generates and/or executes the execution instruction for the object to be checked based on the verification result. In this case, potential safety hazards in the operating process of the object to be checked due to the false spot check report is avoided, and a safety risk of the driver, and persons, goods and equipment around the object to be checked is reduced. In addition, a monitoring solution according to the present disclosure is more flexible and adapts to more application scenarios.

The objects, features and advantages of the present disclosure will become more apparent and easier to be understood from the following detailed description of embodiments of the present disclosure made with reference to the drawings.

Figure 1:
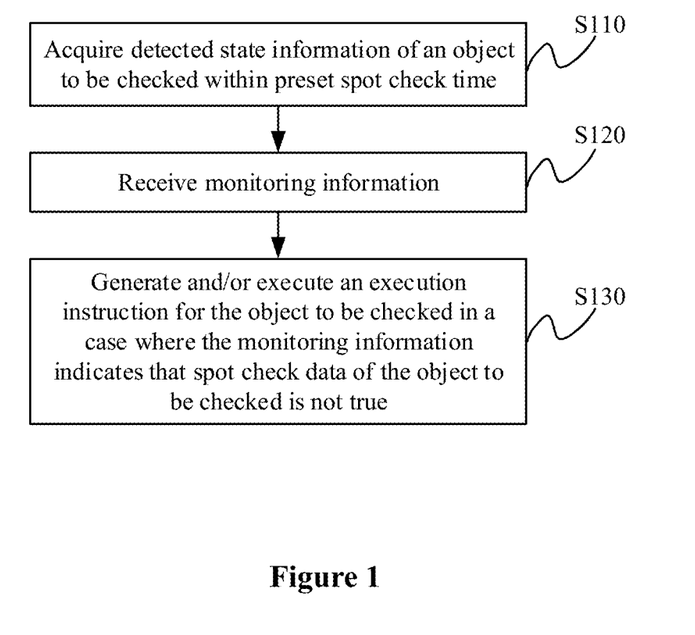
FIG. 1 is a schematic flowchart of a monitoring method according to an embodiment of the present disclosure.

Reference is made to FIG. 1, which is a schematic flowchart of a monitoring method according to an embodiment of the present disclosure. The monitoring method may include following steps S110 to S130.

In step S110, detected state information of an object to be checked within preset spot check time is acquired.

In practice, in order to monitor operating conditions of the object to be checked such as an industrial equipment or a mobile terminal, a monitoring system may detect the state information of the objects to be checked in a real time manner or periodically, such as the operating conditions of a power component of the object to be checked, image information on spot check of the object to be checked, and operation information such as attitude changing information, speed changing information and current changing information of the object to be checked, and vibration information of the power component. The state information may be determined based on the actually obtained spot check data and a verification mode actually adopted for the object to be checked, which is not limited herein.

In view of the above, in an actual spot check process, an object to be spot-checked is usually required to be started, so as to check whether the operation of braking, steering and traveling of the object is normal. Hence, parameters such as a speed and a current of the object to be spot-checked certainly change, thus the power component of the object to be spot-checked also certainly operate, and an attitude of the object to be spot-checked may generally change, and so on. Therefore, with the present disclosure, it can be confirmed whether a spot check operator actually performs a spot check operation on the object to be checked within the corresponding spot check time through verifying whether the power component of the object to be checked operates or whether the attitude of the object to be checked changes, etc. That is, it is confirmed whether the spot check operator perform the daily spot check on the object to be checked responsibly, so as to determine the authenticity of the generated and received spot check report of the object to be checked.

It may be seen that in the embodiment, the above step S120 may include following steps.

Motion information of the object to be checked within the preset spot check time detected by multiple sensors is acquired. The motion information includes one or more of vibration information of a power component, attitude changing information, speed changing information and current changing information.

The sensor may include one or a combination of an attitude sensor, a current sensor, a vibration sensor and a speed sensor. Practically, the sensors used in the present disclosure are not limited to the above sensors, hence the combination of the sensors is also not limited herein. The sensors adopted herein may be determined based on actual needs and specific state information, and are not enumerated herein.

Practically, besides the above enumerated several detection modes, in the present disclosure, the spot check operator may be required to shoot a spot check process of the spot check device performed on the object to be checked, and the shot process is determined as a basis for determining whether the spot check operator performs the spot check on the object to be checked responsibly. Hence, in the present disclosure, the image information on the spot check of the object to be checked within the preset spot check time acquired by a video monitoring device may be acquired.

Based on this, in the present disclosure, the image information on the spot check of the object to be checked may be acquired by using the video monitoring device such as a video camera, a camera or other mobile terminals with an image capturing function. A specific structure of the video monitoring device is not limited in the present disclosure. Accordingly, the acquired image information on the spot check may be a photograph or a video, etc., which may include the spot check process of the spot check operator performed on the object to be checked, such as a steering, travelling process of the object to be checked, and may also include an input operation of the spot check operator performed on the spot check device, etc. The image information may be determined based on actual conditions, and is not enumerated herein.

It should be noted that besides the above detection modes of the state information, other detection modes may also be used, as long as it can be verified whether the spot check operator actually completes the daily spot check of the object to be checked. The detection mode is not limited herein.

In step S120, monitoring information is received.

In the embodiment, the monitoring information may include spot check notification information fed back by the spot check device, a verification result based on the state information indicating whether spot check data of the object to be checked is true and transmitted by a terminal or a server, and at least one or any combination of execution instructions generated based on the verification result. The spot check notification information includes the spot check data of the object to be checked.

In practice, the spot check device may include: mobile terminals such as mobile phones, notebook computers, ipads and Personal Digital Assistants (PDAs), and other devices having wireless communication and/or wired communication functions, such as an on-board display terminals, which is not limited herein. After the spot check operator completes the spot check operation on the object to be checked by using these spot check devices, the corresponding spot check notification information may be transmitted to the monitoring device (such as an on-board controller), an on-board terminal, a mobile terminal, and/or a server, etc., for verifying whether the spot check data of the object to be checked included in the spot check notification information is true.

In an embodiment, the spot check device may directly feed back the spot check notification information to the monitoring device, the terminal and/or the server by using a wireless mode (such as WIFI, Zigbee, Near Field Communication (NFC, short distance wireless communication) or Bluetooth, which is not limited herein). Alternatively, the spot check notification information may be transmitted to the terminal or the server, forwarded to the monitoring device via the terminal or the server, and forwarded to a management server through Wideband Code Division Multiple Access (WCDMA), Global System for Mobile Communication (GSM), 3G/4G and other wireless modes. The transmitting mode of the spot check notification information is not limited herein.

The above spot check notification information may include the spot check data of the object to be checked, a type and a model of the object to be checked, spot check items and a spot check operator, etc., which is not limited herein. Specific contents of the spot check data may be determined based on the actual needs, and are not enumerated herein.

When the spot check device transmits the acquired spot check notification information of the object to be checked to the terminal (such as a mobile phone and a Pad) or the server, the terminal or the server may transmit an information acquisition request to the monitoring device to obtain the state information of the object to be checked within the preset spot check time acquired by the monitoring device. Then, the terminal or the server verifies whether the spot check data of the object to be checked within the preset spot check time is true based on the state information, and transmits the obtained verification result to the monitoring device, such that the monitoring device generates an execution instruction for the object to be checked if the monitoring device determines that the verification result indicates that the spot check data of the object to be checked within the preset spot check time is not true.

Practically, after completing the above verification steps, the terminal or the server may further generate the execution instruction for the object to be checked based on the verification result. In this case, the generated execution instruction is directly transmitted to the monitoring device for execution so as to notify administrators and/or drivers and other relevant operators that the daily spot check of the object to be checked is not completed. In order to avoid erroneous driving, the object to be checked may be directly locked, and the present disclosure is not limited to this case.

It should be noted that the spot check notification information, the verification result, and the execution instruction may be directly transmitted to the monitoring device by the spot check device, the terminal or the server, or may be forwarded by the terminal or the server. The above step S120 may include following operations.

Spot check notification information fed back by the spot check device is received; spot check notification information forwarded by the terminal or the server is received; a verification result generated and transmitted by the terminal or a verification result generated by the terminal and forwarded by the server is received; a verification result generated and transmitted by the server or a verification result generated by the server and forwarded by the terminal is received; an execution instruction generated and transmitted by the terminal or an execution instruction generated by the terminal and forwarded by the server is received; or an execution instruction generated and transmitted by the server or an execution instruction generated by the server and forwarded by the terminal is received.

For the verification process for the spot check data of the object to be checked in the above embodiment, in the actual application of the embodiment, specific verification contents may be determined based on specific contents included in the state information. For example, in a case that the state information is the attitude changing information of the object to be checked, it may be verified whether data related to attitude changing of the object to be checked in the received spot check data is consistent with the attitude changing information at corresponding time. If the state information indicates that the object to be checked turns left at a first time instant, it is verified whether left-turn data is included in the spot check data, and whether the left-turn data is generated at the first time instant, which is not limited herein.

If the state information is the vibration information of the power component of the object to be checked, it may be verified whether vibration data of the power component in the received spot check data is consistent with the vibration information at corresponding time. That is, if the state information indicates that an engine of the object to be checked is started at a second time instant, it may be verified whether the spot check data includes the vibration data of the engine generated at the second time instant. The second time instant may be earlier than or the same as the first time instant, which is not limited herein.

Practically, if the state information is the speed changing information and/or the current changing information of the object to be checked, etc., it may be known whether the power component of the object to be checked operates in corresponding time. In this case, it may be verified whether speed and/or current data included in the received spot check data is consistent with the speed changing information and/or the current changing information at the corresponding time. That is, it is verified whether operating conditions of the power component of the object to be checked indicated by the spot check data is consistent with operating conditions of the power component indicated by the state information. Those skilled in the art may determine a specific verification method under a guidance of the concept of the present disclosure, and the verification method is not described in detail herein.

It may be seen that if the spot check data fed back by the spot check device indicates that the object to be checked is normal in braking, steering, hydraulic pressure or travelling, etc., and the detected state information of the object to be checked at the corresponding spot check time indicates that the object to be checked is stationary, a current does not change, or the video monitoring device determines that a vehicle does not move, it can be determined that the spot check operator does not perform the spot check on the object to be checked responsibly, and the obtained spot check data is not true. In this case, the spot check operator is reminded or a generated report of an abnormal event is transmitted to the management server, thereby effectively preventing the spot check operator from performing no spot check operation and arbitrarily completing a spot check item report.

In step S130, the execution instruction for the object to be checked is generated and/or executed in a case where the monitoring information indicates that the spot check data of the object to be checked is not true.

It is indicated that the spot check operator does not perform the daily spot check on the object to be checked responsibly, in a case that the monitoring information indicates that the spot check data of the object to be checked is not true. Specific contents may be determined based on the above verification methods. Based on the verification method described in step S120, the monitoring information indicating that the spot check data of the object to be checked is not true may include following cases.

The monitoring information indicates that the power component of the object to be checked does not operate within the preset spot check time; the monitoring information indicates that an actual attitude of the object to be checked does not change within the preset spot check time; and/or the monitoring information indicates that an actual attitude changing trajectory of the object to be checked within the preset spot check time is inconsistent with an attitude changing trajectory recorded in the spot check data.

It may be determined that the power component does not operate based on the speed changing information, the current changing information, the attitude changing information and other data of the object to be checked, which is not limited herein.

It may be known from the above description that when the spot check operator performs the daily spot check on the object to be checked, the operator needs to start the object to be checked and drive the object to be checked to complete turn, speed changing, braking and other spot check items. Therefore, in the process, the attitude of the object to be checked cannot remain stationary. In this case, it can be verified whether the spot check operator performs the daily spot check on the object to be checked responsibly through detecting the attitude changing of the object to be checked within the spot check time. For the specific spot check process, reference may be made to a conventional daily spot check method of the industrial device, which is not described in detail herein.

Practically, it may be known from the description of the related part that, in the daily spot check process of the object to be checked, other parameters of the object to be checked may change accordingly. In the present disclosure, it can be verified whether the spot check operator performs the spot check operation on the object to be checked responsibly based on other parameters. This process is similar to the above process, and is not described in detail here.

Optionally, if it is determined that the spot check operator does not perform the daily spot check on the object to be checked responsibly, first prompt information may be outputted to remind a corresponding administrator to perform a corresponding operation or generate a corresponding report and feed back the report to the management server. Alternatively, a first locking instruction may be outputted, where the first locking instruction may be used for locking the object to be checked, thereby preventing a driver from driving the object to be checked, in particular an object to be checked in a fault state that is not checked, and preventing affecting safety of the driver, and persons, goods and equipment around the object to be detected. Practically, besides the two modes, other modes may also be adopted to avoid potential safety hazards in the operating process of the object to be checked due to inauthenticity of the spot check report, and are not enumerated herein.

In the present disclosure, outputting manners of the first prompt information are not limited. The first prompt information may be directly displayed through a display terminal, or may be outputted through a corresponding alarm device such as an indicator light, a buzzer or a voice module, as long as the administrator may be notified of a case that the spot check operator does not perform the spot check on the object to be checked responsibly and the corresponding spot check report is not true. The outputting manners are not enumerated herein.

In another embodiment of the present disclosure, based on the above embodiment, it may be determined whether the spot check operator performs the daily spot check on the object to be checked responsibly and the obtained spot check report of the object to be checked is true through verifying whether the spot check operator arrives at a scene of the object to be checked. Based on this, in the present disclosure, a near field detection device, such as an NFC module or a Radio Frequency Identification (RFID) module, may be arranged on the object to be checked or near a position where a trigger signal may be received, that is, a first range around the object to be checked. In this way, once the spot check operator enters the first range around the object to be checked to perform the daily spot check on the object to be checked, it can be detected that the spot check operator enters. Specifically, in the present disclosure, a trigger signal received by the near field detection device may be acquired, where the trigger signal may be generated when the spot check operator triggers the near field detection device. That is, the spot check operator may carry an electronic apparatus including the near field detection device when performing the daily spot check, such as a mobile phone with an NFC function and other mobile terminals, such that once the spot check operator enters the first range around the spot check operator, the mobile terminal may trigger the near field detection device of the object to be checked to generate the trigger signal, as a basis that the spot check operator starts the daily spot check on the object to be checked.

Then, the monitoring device may verify whether the spot check operator is in the first range around the object to be checked based on the trigger signal. That is, it is verified whether the spot check operator arrives at the scene of the object to be checked within the preset spot check time of the object to be checked. If the spot check operator is in the first range around the object to be checked, it is required to further verify whether the obtained spot check data is true through the monitoring method provided in the above embodiment. If the spot check operator is not in the first range around the object to be checked, it is indicated that the spot check operator does not complete the daily spot check on the object to be checked. That is, the spot check data fed back by the spot check device is not true certainly. In this case, the execution instruction for the object to be checked is generated to lock the object to be checked or remind the driver that the object to be checked is not spot-checked, thereby preventing the driver from driving the object to be checked, and preventing affecting safety of the driver, and persons, goods and equipment around the object to be checked.

Optionally, besides the above modes, in the present disclosure, it may be verified whether the spot check operator arrives at the scene of the object to be checked to complete the daily spot check on the object to be checked through detecting geographical location information of the spot check operator. Specifically, the geographical location information of the spot check operator within the preset spot check time may be acquired and it is verified whether the spot check operator is in a second range around the object to be checked within the preset spot check time based on the geographical location information and target location information of the object to be checked. In a case that the spot check operator is in the second range around the object to be checked within the preset spot check time, it is indicated that the spot check operator may perform the daily spot check on the object to be checked. In a case that the spot check operator is not in the second range around the object to be checked within the preset spot check time, the execution instruction for the object to be checked is generated directly to prevent the driver from driving the object to be checked or remind the driver. If other administrators are reminded to timely arrange the spot check operator to perform the daily spot check on the object to be checked carefully, the working conditions of the spot check operator can be supervised, as a basis for management of the spot check operator, which is not limited herein.

The geographical location information may be acquired through a Global Positioning System (GPS) module, a WIFE ultra-width band (UWB) module of the mobile terminal or other devices carried by the spot check operator. The acquiring manner is not limited in the present disclosure. Practically, it should be noted that manners of verifying whether the spot check operator arrives at the scene of the object to be checked are not limited to the above-mentioned several modes, as long as the object of the present disclosure can be achieved. The manners of verifying are not enumerated herein.

Moreover, based on the above embodiments, in a case that the monitoring information indicates that the spot check data is true, that is, the generated spot check report of the object to be checked is true, the monitoring device may directly control the object to be checked to be unlocked, for facilitating operating the object to be checked by the driver. The management server may also remotely control the object to be checked to be unlocked and notify the driver who is to drive the object to be checked that the daily spot check of the object to be checked is qualified and other notification information, so that the driver may drive the object to be checked to perform safe and reliable operations. Alternatively, the administrator or maintenance persons are notified that the object to be checked should be spot-checked carefully and timely, so as to determine whether the daily spot check items of the object to be checked are qualified, which is not limited herein.

In order to improve the efficiency of enterprise management, after the verification result is obtained, information sharing or communication may be achieved through information interaction platforms such as FACEBOOK, WeChat, QQ or other dedicated applications, so as to prevent the erroneous operation on the object to be checked that is faulty and is not spot-checked by the driver, thereby preventing affecting safety of the driver, and persons, goods and equipment around the object to be checked.

In view of the above, in the embodiment, a spot check operator may transmit relevant information on spot check to a monitoring device after the spot check operator completes the spot check of the object to be checked by using a spot check device. That is, the monitoring device receives spot check notification information fed back by the spot check device and acquires detected state information of the object to be checked within the preset spot check time, thereby directly verifying whether received spot check data of the object to be checked is true. An execution instruction for the object to be checked is generated in a case where the received spot check data of the object to be checked is not true, thereby avoiding safety hazards of the object to be checked in an operating process due to a false spot check report. Moreover, the spot check notification information fed back by the spot check device may be transmitted to a terminal or a server for subsequent verification, and then a verification result indicating whether the spot check data of the object to be checked is true or an execution instruction generated based on the verification result is transmitted to the monitoring device. The monitoring device generates and/or executes the execution instruction for the object to be checked based on the verification result. In this case, potential safety hazards in the operating process of the object to be checked due to the false spot check report is avoided, and a safety risk of the driver, and persons, goods and equipment around the object to be checked is reduced. In addition, a monitoring solution according to the present disclosure is more flexible and adapts to more application scenarios.

Figure 2:
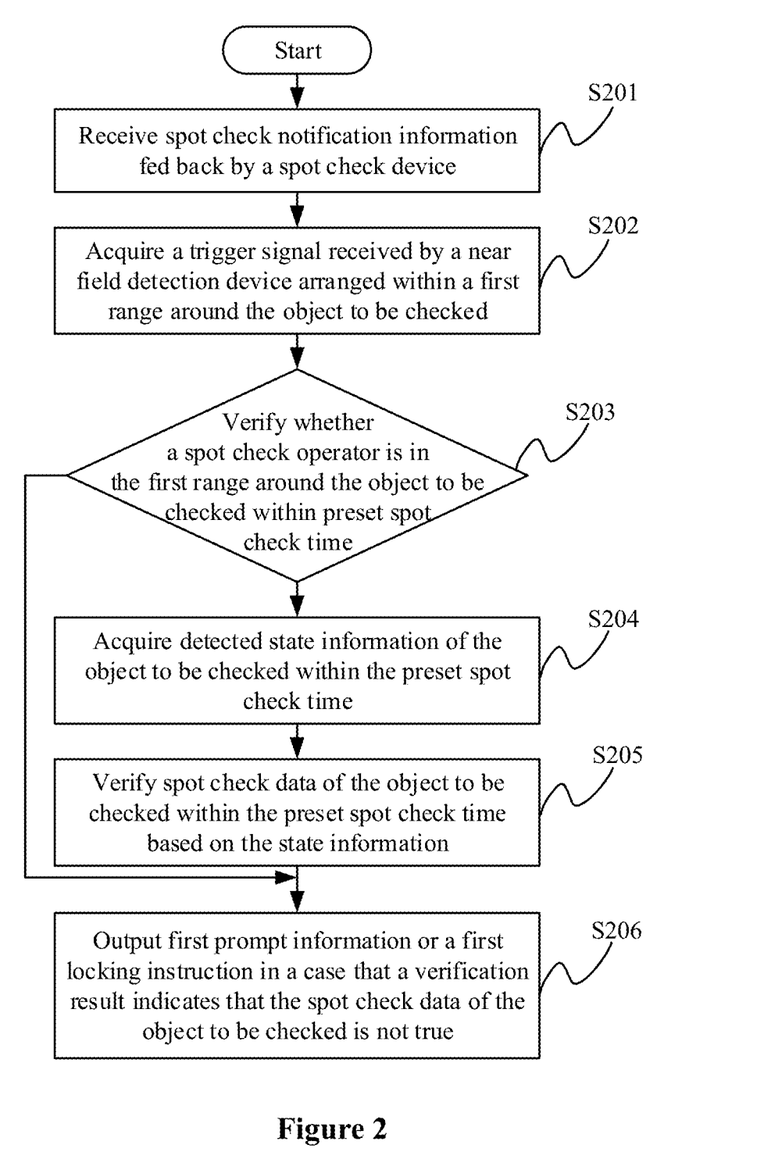
FIG. 2 is a schematic flowchart of a monitoring method according to a preferred embodiment of the present disclosure.

Reference is made to FIG. 2, which is a schematic flowchart of a monitoring method according to a preferred embodiment of the present disclosure. The preferred embodiment describes only one of monitoring method embodiments provided in the present disclosure, and is not intended to limit the present disclosure. The present disclosure only illustrates a specific operation mode in practice by taking the preferred embodiment as an example. The method may include the following steps S201 to S206.

In step S201, spot check notification information fed back by a spot check device is received.

The spot check notification information may include spot check data of the object to be checked, etc., which is not limited herein.

It should be noted that, in the embodiment, the monitoring device directly acquires the spot check notification information fed back by the spot check device, for example. The steps performed by the terminal or the server of verifying whether the spot check data of the object to be checked is true, and transmitting a verification result or an execution instruction generated based on the verification result to the monitoring device in the above embodiments are not described in detail herein.

In step S202, a trigger signal received by a near field detection device arranged within a first range around the object to be checked is acquired.

In the embodiment, the trigger signal may be generated when a spot check operator triggers the near field detection device. The near field detection device may be an NFC module, an RFID module, etc. The near field detection device is not limited in the present disclosure, as long as it can be detected whether the spot check operator arrives at the scene of the object to be checked.

Moreover, the first range may be determined based on a specific structure and performances of the near field detection device. The first range may be a maximum space range of the scene of the object to be checked in which the near field detection device can detect that the spot check operator carrying the corresponding near field detection device arrives, and a specific value of the first range is not limited herein.

In step S203, it is verified whether the spot check operator is in the first range around the object to be checked within the preset spot check time based on the trigger signal. In a case that the spot check operator is in the first range, step S204 is performed. In a case that the spot check operator is not in the first range, step S206 is performed.

In a case that the spot check operator is in the first range around the object to be checked within the preset spot check time of the object to be checked, it is indicated that the spot check operator is on the scene within the preset spot check time of the object to be checked. In this case, the spot check operator can perform the daily spot check on the object to be checked, hence it is necessary to verify the authenticity of the spot check data fed back by the spot check device, as a basis for determining whether the spot check operator performs the daily spot check on the object to be checked responsibly.

In a case that the spot check operator does not arrive at the scene of the object to be checked within the preset spot check time and since the corresponding spot check data can only be obtained by on-site operation for the daily spot check of the object to be checked, the spot check data fed back by the spot check device is not true certainly, and it can be determined that the spot check operator does not perform the daily spot check on the object to be checked responsibly.

In Step S204, detected state information of the object to be checked within the preset spot check time is acquired.

In the embodiment, the state information may include motion information of the object to be checked, such as one or more of vibration information of a power component, attitude changing information, speed changing information and current changing information, and may further include image information on the spot check of the object to be checked, which is not limited herein.

In step S205, the spot check data of the object to be checked within the preset spot check time is verified based on the state information.

In step S206, in a case that the verification result indicates that the spot check data of the object to be checked is not true, first prompt information or a first locking instruction is outputted.

The outputted result in step S206 may indicate that the spot check operator does not perform the daily spot check on the object to be checked responsibly, and the specific outputted contents may be determined according to the above verification method and are not limited herein. The first prompt information may be voice information, light information or a buzzer sound, etc., and is not limited herein.

Practically, the object to be checked may be locked by using the outputted first locking instruction to prevent the driver from erroneous driving, thereby preventing affecting the safety of the driver, and persons, goods and equipment around the object to be checked.

It can be known from the above analysis that in an actual application of the embodiment, after it is preliminarily verified that the spot check operator arrives at the scene of the object to be checked, the spot check data of the object to be checked within the spot check time fed back by the spot check device is further verified by using the acquired state information of the object to be checked at the spot check time. The first prompt information is outputted to remind the administrator or the driver, etc., or the first locking instruction is directly outputted to lock the object to be checked, in a case that the verification result indicates that the spot check data of the object to be checked is not true. In this way, the driver is fundamentally prevented from driving the object to be checked, so as to avoid safety hazards in the operating process of the object to be checked due to untrue spot check data and the untrue spot check report of the object to be checked, thereby preventing affecting the safety of the driver, and persons, goods and equipment around the object to be checked.

Figure 3:
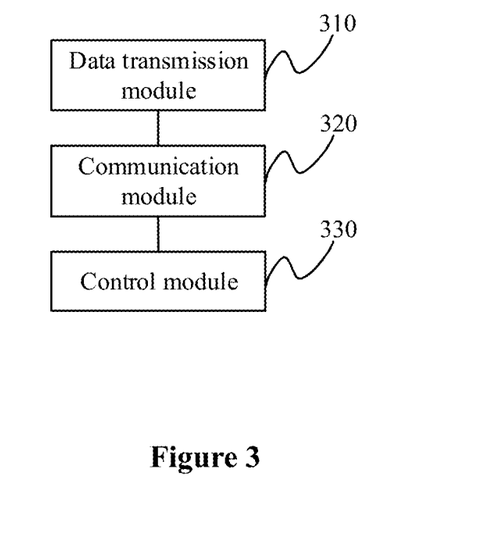
FIG. 3 is a schematic structural diagram of a monitoring device according to an embodiment of the present disclosure.

Reference is made to FIG. 3, which is a schematic structural diagram of a monitoring device according to an embodiment of the present disclosure. In practice, the monitoring device may be an on-board controller, etc., which may be arranged in an engine, a chassis, a frame, a motor or other devices of the object to be checked. The position of the monitoring device is not limited in the present disclosure. The monitoring device in the embodiment may include a data transmission module 310, a communication module 320 and a control module 330.

The data transmission module 310 is configured to acquire detected state information of an object to be checked within preset spot check time.

In order to manage or monitor the object to be checked, a spot check system usually detects the state information of the object to be checked, such as the industrial vehicle listed above, in real time by using a corresponding detection device, so that it can be verified whether the spot check operator performs the spot check on the object to be checked responsibly based on the state information in the present application.

Optionally, the state information may include operating conditions of a power component of the object to be checked, image information on the spot check of the object to be checked, and operation information such as attitude changing information, speed changing information and current changing information of the object to be checked, and vibration information of the power component. The state information may be determined based on the actually acquired spot check data and a verification mode actually performed on the object to be checked, which is not limited herein.

The communication module 320 is configured to receive monitoring information.

The above monitoring information may include spot check notification information fed back by a spot check device, a verification result based on the state information indicating whether spot check data of the object to be checked is true and transmitted by a terminal or a server, and at least one or any combination of execution instructions generated based on the verification result, which is not limited herein.

In addition, the above spot check notification information may include spot check data of the object to be checked and corresponding spot check time, etc., which is not limited herein. In practice, the spot check device may directly transmit the obtained spot check data of the object to be checked to the monitoring device. Alternatively, the spot check device may transmit the spot check data to the terminal or the server, the terminal or the server directly forward the spot check data or perform verification on the spot check data, to transmit a verification result or the execution instruction generated based on the verification result to the monitoring device.

Moreover, the spot check device may be an on-board display device, an input/output device, a handheld mobile terminal, etc., and is not limited in the present disclosure. In the present disclosure, a specific composition structure of the communication module is determined based on the specific structure of the spot check device. In practice, the communication module may be a WIFi module, a GSM module or a 3G/4G module, etc., which is not limited herein.

The control module 330 is configured to generate and/or execute an execution instruction for the object to be checked in a case where the monitoring information indicates that the spot check data of the object to be checked is not true.

For a verification process of the obtained spot check data of the object to be checked, reference may be made to the description of a corresponding part of the above method embodiment, and the verification process is not described herein again. In a case that the verification result indicates that the spot check data of the object to be checked is not true, that is, it is determined that the spot check operator does not perform the daily spot check on the object to be checked responsibly, the control module 330 may directly generate and output the first prompt information or the first locking instruction, so as to remind the driver or the administrator, etc. based on the first prompt information, or lock the object to be checked based on the first locking instruction, thereby preventing the driver from driving the object to be checked for which the spot check verification fails, and thus preventing affecting the safety of the driver, and persons, goods and equipment around the object to be checked.

Optionally, after the obtained spot check data of the object to be checked is directly transmitted to the monitoring device by the spot check device or is forwarded to the monitoring device via the mobile terminal or the server, the monitoring device may verify the spot check data of the object to be checked by directly using the state information. Hence, based on the above embodiments, the monitoring device in the present disclosure may further include a verification module.

The verification module is configured to verify the spot check data of the object to be checked within the preset spot check time by using the state information acquired by the data transmission module.

In an actual application of the embodiment, verification contents may change based on specific contents of the state information. For the specific contents, reference may be made to the corresponding part of the above method embodiment, and the specific contents are not described in detail herein.

In a case that the spot check data of the object to be checked is verified by the terminal or the server, the communication module 320 is further configured to receive an information acquisition request transmitted by the terminal or the server, and transmit the state information to the terminal or the server. For a specific process, reference may be made to the corresponding part of the above method embodiment, and the process is not described in detail herein.

Optionally, in practice, in the present disclosure, it is first verified whether the spot check operator arrives at the scene of the object to be checked within the preset spot check time, thereby reducing the unnecessary verification of the spot check data and improving a monitoring processing efficiency.

Specifically, in the present disclosure, an appropriate near field detection device, such as NFC, may be arranged in a first range around the object to be checked. In this case, a trigger signal received by the near field detection device may be acquired through the data transmission module 320, where the trigger signal is generated when the spot check operator triggers the near field detection device. Hence, the control module 330 may verify whether the spot check operator is in the first range around the object to be checked within the preset spot check time based on the trigger signal. That is, within the preset spot check time of the object to be checked, it is verified whether the spot check operator arrives at the scene of the object to be checked, and a verification result functions as a basis for determining whether the spot check operator performs the spot check responsibly. In a case that the spot check operator is not in the first range around the object to be checked within the preset spot check time, the execution instruction for the object to be checked is generated so as to remind the driver or the administrator, or directly lock the object to be checked, which is not limited herein.

Practically, in a case where the spot check system further includes a location detection device, such as a GPS, the data transmission module 310 may further acquire geographical location information of the spot check operator within the preset spot check time. Accordingly, the control module 330 may verify whether the spot check operator is in a second range around the object to be checked within the preset spot check time, based on the geographical location information and target location information of the object to be checked. In a case where the spot check operator is not in the second range around the object to be checked within the preset spot check time, the execution instruction for the object to be checked is generated.

In summary, in the embodiment, a spot check operator may transmit relevant information on spot check to the monitoring device after the spot check operator completes the spot check of the object to be checked by using a spot check device. That is, the monitoring device receives spot check notification information fed back by the spot check device and acquires detected state information of the object to be checked within the preset spot check time, thereby directly verifying whether received spot check data of the object to be checked is true. An execution instruction for the object to be checked is generated in a case where the received spot check data of the object to be checked is not true, thereby avoiding safety hazards of the object to be checked in an operating process due to a false spot check report. Moreover, the spot check notification information fed back by the spot check device may be transmitted to a terminal or a server for subsequent verification, and then a verification result indicating whether the spot check data of the object to be checked is true or an execution instruction generated based on the verification result is transmitted to the monitoring device. The monitoring device generates and/or executes the execution instruction for the object to be checked based on the verification result. In this case, potential safety hazards in the operating process of the object to be checked due to the false spot check report is avoided, and a safety risk of the driver, and persons, goods and equipment around the object to be checked is reduced. In addition, a monitoring solution according to the present disclosure is more flexible and adapts to more application scenarios.

Figure 4:
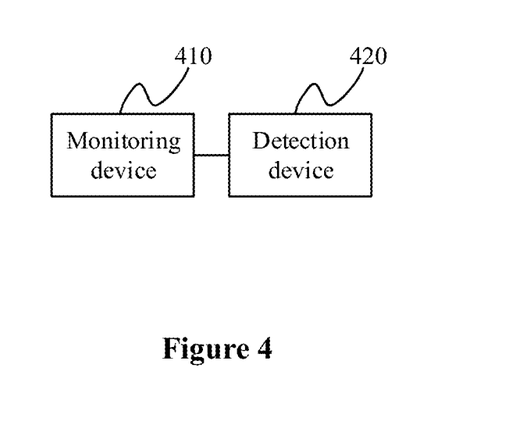
FIG. 4 is a schematic structural diagram of a monitoring system according to an embodiment of the present disclosure.

Reference is made to FIG. 4, which is a schematic structural diagram of a monitoring system according to an embodiment of the present disclosure. The system may include a monitoring device 410 and a detection device 420.

For a specific composition structure of the monitoring device 410, reference may be made to the composition structure and functions of the monitoring device described in the above device embodiments, and the specific structure is not described in detail herein.

Optionally, in practice, based on difference state information of the object to be checked acquired by the monitoring device, the detection device 420 may include multiple sensors.

The multiple sensors are configured to detect motion information of the object to be checked within preset spot check time. The motion information includes one or more of vibration information of a power component, attitude changing information, speed changing information, and current changing information, which is not limited herein. Correspondingly, the multiple sensors may include an attitude sensor, a current sensor, a vibration sensor, a speed sensor, etc., which is not limited herein.

The above multiple sensors may include sensors in the mobile terminal such as a mobile phone, such as an acceleration sensor or a gravity sensor. In this case, it is unnecessary to additionally provide a sensor in the mobile terminal, thereby acquiring corresponding operation information and the like by using the existing sensors included in the mobile terminal. Practically, it should be noted that the sensor is not limited to the sensor included in the above mobile terminal such as the mobile phone, and may be a sensor included in other devices, which is not limited herein.

Moreover, besides the above sensors, the detection device 420 may further include: a video monitoring device configured to acquire image information on spot check of the object to be checked within the spot check time.

In an actual application of the embodiment, the video monitoring device 420 may be a video camera, a camera and mobile terminals with an image capturing and/or photographing function, etc., which is not limited herein. Correspondingly, the acquired image information on the spot check may be a video or a photograph, and the like. The image information on the spot check may include a spot check process of the spot check operator performed on the object to be checked. For example, the image information on the spot check may include turning and travelling processes of the object to be checked, etc., or an input operation performed on the object to be checked by the spot check operator. The image information may be determined according to actual needs, and is not enumerated herein.

Based on this, the above monitoring device may generate the execution instruction for the object to be checked to remind the driver or the administrator, or directly lock the object to be checked, in a case where the monitoring information indicates that the power component of the object to be checked does not operate within the preset spot check time, the monitoring information indicates that an actual attitude of the object to be checked does not change within the preset spot check time, and/or the monitoring information indicates that an actual attitude changing trajectory of the object to be checked within the preset spot check time is inconsistent with an attitude changing trajectory recorded in the spot check data. In this way, the authenticity of the obtained spot check report of the object to be checked is ensured, and the working conditions of the spot check operator are supervised based on the spot check report.

In another embodiment of the present disclosure, based on the above embodiment, the system may further include a near field detection device arranged in a first range around the object to be checked, such as an NFC device or an RFID device. The near field detection device is configured to detect whether the spot check operator arrives at the scene of the object to be checked within the preset spot check time.

Practically, the system further includes a location detection device, such as a GPS. It is verified whether the spot check operator arrives at the scene of the object to be checked within the preset spot check time based on the geographical location information of the spot check operator within the preset spot check time acquired by the location detection device. The present disclosure is not limited to the verification mode.

Figure 5:
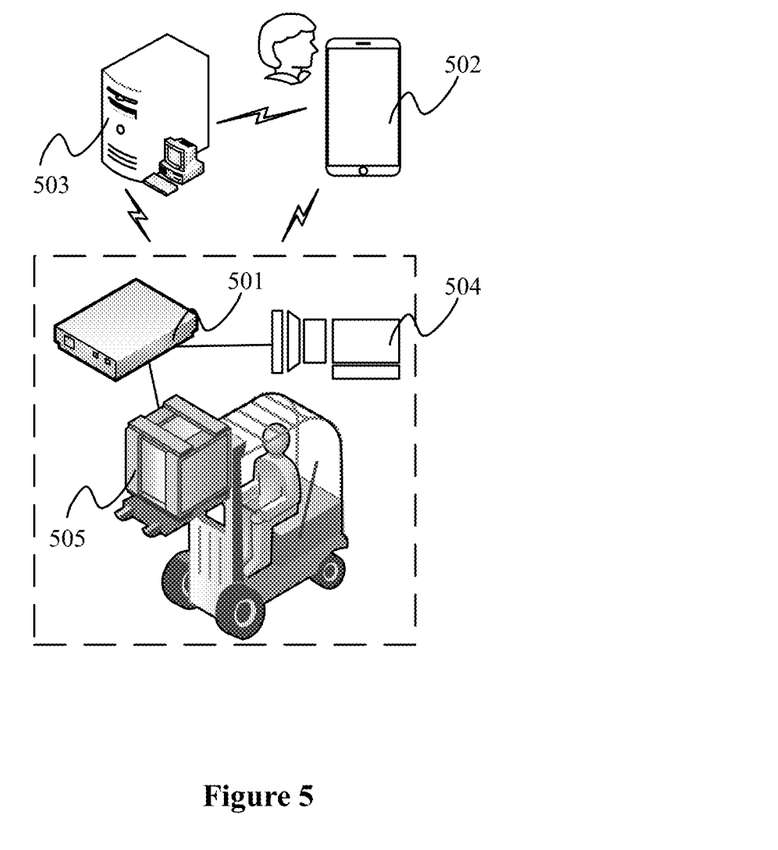
FIG. 5 is a schematic structural diagram of another monitoring system according to an embodiment of the present disclosure.

Based on the above description, in practice, as shown in FIG. 5, the monitoring system may include a controller 501, a mobile terminal 502, a server 503 and a detection device 504 (only a video monitoring device is shown in FIG. 5). It should be noted that only one object to be checked 505 is taken as an example for describing the embodiment in FIG. 5. In practice, the server 503 may monitor multiple objects to be checked. Specific processes are similar, and are not enumerated herein.

The controller may be the above monitoring device. For functions of the controller, reference may be made to functions of the monitoring device described in the device embodiment, and the functions are not described in detail herein. In the embodiment, the controller may be an on-board controller with wireless communication and wired communication functions, and the present disclosure is not limited to the on-board controller.

The spot check device of the spot check system may transmit spot check notification information to the controller 501, the mobile terminal 502 and the server 503 at the same time, so that the controller 501, the mobile terminal 502 and the server 503 perform corresponding processing operations by using the spot check notification information. For specific processes, reference may be made to a description of the corresponding part of the above method and device embodiments, and the process is not described in detail herein. It may be seen that the working conditions of the spot check operator are supervised, it can be avoided that the spot check operator does not perform the spot check on the object to be checked responsibly, and thus the spot check report of the object to checked is not true. Therefore, safety hazards of the working process of the object to checked is avoided, thereby preventing affecting the safety of the driver, and persons, goods and equipment around the object to be checked.

Optionally, in practice, the above system may further include an on-board terminal. The on-board terminal directly forwards the spot check notification information to the controller after the spot check notification information is received, or determines whether the spot check data of the object to be checked is true based on the spot check notification information and the obtained state information, then feeds back a determination result to the controller for subsequent processing. For a specific process, reference may be made to a description of a corresponding part of the above method embodiment, which is not described in detail herein. It should be noted that the on-board terminal may replace the mobile terminal in the above embodiment, and a specific monitoring process is similar to that described in the above embodiments, which is not described in detail herein.

Moreover, the controller 501, the mobile terminal 502 and/or the on-board terminal and the detection device 504 in the above embodiment may function as a small system for performing information interaction with the above server 503. For a specific interaction process, reference may be made to a description of a corresponding part of the above embodiment, which is not described in detail herein.

In addition, it should be noted that, in the above embodiments, relationship terms such as "first" and "second" are only used for distinguishing one operation or module from another operation or module, and do not necessarily require or imply that there is an actual relationship or sequence between these modules or operations.

The embodiments of the present disclosure are described in a progressive manner, and each embodiment places emphasis on the difference from other embodiments. Therefore, for the same or similar parts between the embodiments, one may refer to the description of other embodiments. For the device and system according to the embodiments, the device corresponds to the method according to the embodiments, and the system includes the device. Therefore, the description of the device and the system is simple, and for the related parts, one may refer to the description of the method embodiments.

The above description of the embodiments enables those skilled in the art to implement or use the present disclosure. Various modifications to these embodiments are apparent to those skilled in the art, and the general principles defined herein may be implemented in other embodiments without deviating from the spirit or scope of the present disclosure. Therefore, the present disclosure is not limited to these embodiments described herein, but conforms to the widest scope in accordance with the principles and the novel features disclosed herein.

The invention claimed is:

1. A monitoring method, comprising:
  acquiring detected state information of an object to be checked within preset spot check time;
  receiving monitoring information, wherein the monitoring information comprises spot check notification information fed back by a spot check device, a verification result based on the state information indicating whether spot check data of the object to be checked is true and transmitted by a terminal or a server, and at least one or any combination of execution instructions generated based on the verification result, wherein the spot check notification information comprises the spot check data of the object to be checked; and
  generating and/or executing the execution instruction for the object to be checked in a case where the monitoring information indicates that the spot check data of the object to be checked is not true.

2. The method according to claim 1, wherein the receiving the monitoring information comprises:
  receiving spot check notification information fed back by the spot check device;
  receiving spot check notification information forwarded by the terminal or the server;
  receiving a verification result generated and transmitted by the terminal or a verification result generated by the terminal and forwarded by the server;
  receiving a verification result generated and transmitted by the server or a verification result generated by the server and forwarded by the terminal;
  receiving an execution instruction generated and transmitted by the terminal or an execution instruction generated by the terminal and forwarded by the server; or
  receiving an execution instruction generated and transmitted by the server or an execution instruction generated by the server and forwarded by the terminal.

3. The method according to claim 2, wherein after the receiving the spot check notification information fed back by the spot check device, the method further comprises:
  verifying, based on the state information, the spot check data of the object to be checked within the preset spot check time.

4. The method according to claim 2, further comprising:
  receiving an information acquisition request transmitted by the terminal or the server; and
  transmitting the state information to the terminal or the server in response to the information acquisition request.

5. The method according to claim 1, wherein the acquiring detected state information of an object to be checked within preset spot check time comprises:
  acquiring motion information of the object to be checked within the preset spot check time which is detected by a plurality of sensors, wherein the motion information comprises one or more of vibration information of a power component, attitude changing information, speed changing information, and current changing information; and/or
  acquiring image information on spot check of the object to be checked within the preset spot check time acquired by a video monitoring device.

6. The method according to claim 5, wherein the monitoring information indicating that the spot check data of the object to be checked is not true comprises:
  the monitoring information indicates that the power component of the object to be checked does not operate within the preset spot check time;
  the monitoring information indicates that an actual attitude of the object to be checked does not change within the preset spot check time; and/or
  the monitoring information indicates that an actual attitude changing trajectory of the object to be checked within the preset spot check time is inconsistent with an attitude changing trajectory recorded in the spot check data.

7. The method according to claim 6, wherein the generating and/or executing the execution instruction for the object to be checked comprises:

outputting and/or executing first prompt information or a first locking instruction, wherein the first locking instruction is used for locking the object to be checked.

8. The method according to claim 1, further comprising:

acquiring a trigger signal received by a near field detection device arranged within a first range around the object to be checked, wherein the trigger signal is generated when a spot check operator triggers the near field detection device; and verifying, based on the trigger signal, whether the spot check operator is in the first range around the object to be checked within the preset spot check time, wherein the monitoring information indicates that the spot check data of the object to be checked is not true comprises:

the spot check operator is not in the first range around the object to be checked within the preset spot check time.

9. The method according to claim 1, further comprising:

acquiring geographical location information of a spot check operator within the preset spot check time; and verifying whether the spot check operator is in a second range around the object to be checked within the preset spot check time based on the geographical location information and target location information of the object to be checked, wherein the monitoring information indicates that the spot check data of the object to be checked is not true comprises:

the spot check operator is not in the second range around the object to be checked within the preset spot check time.

* * * * *